US012147260B2

(12) United States Patent
Przyborowski

(10) Patent No.: US 12,147,260 B2
(45) Date of Patent: Nov. 19, 2024

(54) START-UP CIRCUIT FOR REFERENCE VOLTAGE/CURRENT GENERATOR

(71) Applicant: Nordic Semiconductor ASA, Trondheim (NO)

(72) Inventor: Dominik Przyborowski, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 265 days.

(21) Appl. No.: 17/693,100

(22) Filed: Mar. 11, 2022

(65) Prior Publication Data

US 2022/0357758 A1 Nov. 10, 2022

(30) Foreign Application Priority Data

May 5, 2021 (FI) ..................................... 20215524

(51) Int. Cl.
*G05F 3/26* (2006.01)
*G05F 3/24* (2006.01)

(52) U.S. Cl.
CPC .............. *G05F 3/262* (2013.01); *G05F 3/242* (2013.01)

(58) Field of Classification Search
CPC . G05F 3/242; G05F 3/262; G05F 3/30; G05F 1/468
See application file for complete search history.

(56) References Cited

U.S. PATENT DOCUMENTS 5,912,580 A * 6/1999 Kimura .................. G05F 3/225 327/540
2012/0229117 A1* 9/2012 Nikolov ................. G05F 3/242 323/313
2021/0048837 A1 2/2021 Watanabe

FOREIGN PATENT DOCUMENTS

CN 102385407 B 6/2013

OTHER PUBLICATIONS

Finnish Patent and Registration Office Search Report dated Dec. 8, 2021, in connection with corresponding FI Application No. 20215524 (1 pp.).

* cited by examiner

*Primary Examiner* — Jue Zhang
(74) *Attorney, Agent, or Firm* — Nixon & Vanderhye PC

(57) ABSTRACT

A start-up circuit for a self-biasing generator provides a reference voltage or a reference current, the start-up circuit including an impedance circuit. In response to a start-up signal input to the start-up circuit, the impedance circuit is coupled to a bias voltage line of a current mirror circuit of the self-biasing generator, thereby inducing current to flow in the self-biasing generator and starting the self-biasing generator. A bypass current source is coupled to the current mirror circuit and to the impedance. The bypass current source is configured to be driven by a current in the current mirror circuit and to supply current to the impedance in proportion to the current in the current mirror circuit, thereby limiting the current induced to the self-biasing generator by the start-up circuit.

12 Claims, 2 Drawing Sheets

START-UP CIRCUIT FOR REFERENCE VOLTAGE/CURRENT GENERATOR

This application claims priority to FI 20215524 filed May 5, 2021, the entire contents of which are hereby incorporated by reference.

TECHNICAL FIELD

Embodiments described herein relate to electronics and, particularly, to a start-up circuit for a reference voltage/current generator.

BACKGROUND

Reference voltage/current generators are building blocks commonly used to generate an accurate quantity of voltage/current used by sensitive circuits in electronics systems. Such systems may include power management, sensor, or signal processing circuits embedded on a system-on-chip (SoC), for example. The reference voltage/current generators are conventionally self-biasing, which means that they require a start-up circuit to activate them. The purpose of the start-up circuit is either to induce current to the reference voltage generator or to draw current from it, thereby waking up the reference voltage generator to generate the reference voltage/current. In conventional designs where the start-up circuit either pulls current from or charges the reference voltage/current generator, the current induced by the start-up circuit causes a peak in the reference voltage/current above a reference level. Such a peak is highly undesirable and may in worst cases cause oscillation in the reference voltage/current generator.

BRIEF DESCRIPTION

According to an aspect, there is provided a start-up circuit for a self-biasing generator providing a reference voltage or a reference current, the start-up circuit comprising: an impedance circuit; means for coupling, in response to a start-up signal input to the start-up circuit, the impedance circuit to a bias voltage line of a current mirror circuit of the self-biasing generator, thereby inducing current to flow in the self-biasing generator and starting the self-biasing generator; a bypass current source coupled to the current mirror circuit and to the impedance, wherein the bypass current source is configured to be driven by a current in the current mirror circuit and to supply current to the impedance in proportion to the current in the current mirror circuit, thereby limiting the current induced to the self-biasing generator by the start-up circuit, wherein the bypass current source is dimensioned to have greater dimensions than a biasing transistor of the current mirror circuit.

The technical effect of the start-up circuit is reduced overshooting over a target value of the reference voltage and/or reference current output by the generator.

In an embodiment, the bypass current source is has a greater current output capability than the biasing transistor. Accordingly, the overshooting can be further reduced.

In an embodiment, the bypass current source comprises a transistor and the dimensions of the bypass current source are defined by:

$$\frac{W_{30}/L_{30}}{W_{22}/L_{22}} \geq \frac{V_{BIAS}}{Z_{36}} \frac{1}{I_{BIAS}}$$

where $W_{30}$ and $L_{30}$ represent a channel width and a channel length of the transistor comprised in the bypass current source, respectively, $W_{22}$ and $L_{22}$ represent a channel width and a channel length of the transistor of the current mirror circuit, Vbias and Ibias represent a bias voltage and a bias current of the current mirror circuit, respectively, and $Z_{36}$ represents impedance of the impedance circuit. Such a condition enables elimination of the overshooting.

In an embodiment, the means for coupling comprises a first switch configured to couple the impedance circuit to the bias voltage line and a second switch configured to couple the bypass current source to the impedance circuit. The switches provide improved control of the start-up circuit.

In an embodiment, the first switch and the second switch couple parallel current paths of the start-up circuit. In this manner, independent control of the parallel current paths can be provided.

In an embodiment, the first switch and the second switch are configured to close concurrently in response to the start-up signal. Accordingly, the bypass signal path is available as soon as the start-up circuit starts up the self-biasing generator, thus reducing the overshooting.

In an embodiment, the bypass current source comprises a transistor having a gate coupled to the current mirror circuit. In the simplest form, the current source may be the transistor, thus providing a simple circuit design.

In an embodiment; the impedance circuit is configured to, when coupled to the current mirror circuit, to draw current from the current mirror circuit, thereby starting the self-biasing generator. The impedance circuit may be configured to effectively ground the current mirror circuit; when coupled to the current mirror circuit. Accordingly, the start-up may be carried out with a simple design.

In an embodiment, the start-up signal is configured to be responsive to a power-up signal enabling the start-up circuit and the self-biasing generator and to a state of the self-biasing generator. The start-up signal may be further configured to disable the start-up circuit when the self-biasing generator has reached its operational state and is outputting at least one of a reference voltage and a reference current at a target level. Accordingly, the start-up circuit is operational only for the required duration, thus improving power-efficiency.

According to an aspect, there is provided a self-biasing generator for providing a reference voltage or a reference current, comprising: a current mirror circuit; an output signal line coupled to the current mirror circuit and configured to output the reference voltage or the reference current; and the start-up circuit of any above-described embodiment.

The embodiments and features, if any, described in this specification that do not fall under the scope of the independent claims are to be interpreted as examples useful for understanding various embodiments of the invention.

BRIEF DESCRIPTION OF DRAWINGS

In the following, example embodiments will be described in greater detail with reference to the attached drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words “comprising” and “including” should be understood as not limiting the described embodiments to consist of only those features that have been mentioned and such embodiments may contain also features/structures that have not been specifically mentioned.

According to an embodiment, there is provided a start-up circuit for a self-biasing generator providing a reference voltage or a reference current. In general, the self-biasing generator may be called a reference quantity generator, wherein the quantity refers to a reference level of an electric quantity such as the voltage and current. The start-up circuit comprises an impedance circuit and means for coupling, in response to a start-up signal input to the start-up circuit, the impedance circuit to a bias voltage line of a current mirror circuit of the self-biasing generator, thereby inducing current to flow in the self-biasing generator and starting the self-biasing generator. The start-up circuit further comprises a bypass current source coupled to the current mirror circuit and to the impedance, wherein the bypass current source is configured to be driven by a current in the current mirror circuit and to supply current to the impedance in proportion to the current in the current mirror circuit, thereby limiting the current induced to the self-biasing generator by the start-up circuit.

Accordingly, the embodiment provides a bypass current path where the current in the bypass current path is controlled by the bypass current source that is driven by the current in the current mirror circuit. As the current in the current mirror circuit increases, the bypass current source increases the current in the bypass current path, thus changing the voltage over the impedance circuit which again reduces the current induced from the start-up circuit to the self-biasing generator. Accordingly, the induced current is limited and the problem mentioned in Background can be reduced or even avoided. The result is that the current in the self-biasing generator will not overshoot and will settle quickly.

Figure 1:
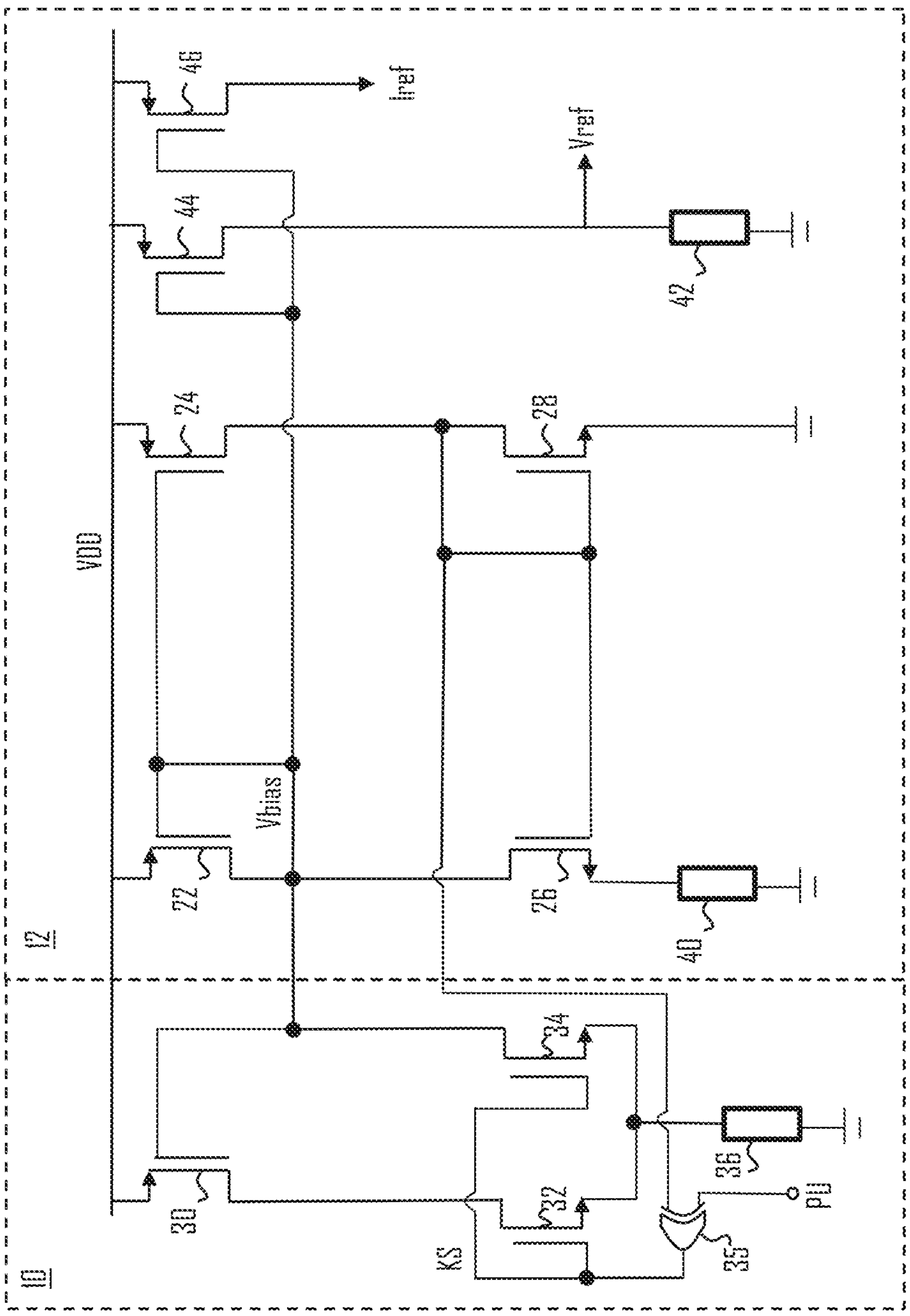
FIG. 1 illustrates an embodiment of a start-up circuit for a reference voltage/current generator.

FIG. 1 illustrates an embodiment of a circuitry comprising, as an embodiment of the self-biasing generator, a reference voltage/current generator circuit 12 and, further, a start-up circuit 10 for the reference voltage/current generator 12. The reference voltage/current generator 12 illustrated in FIG. 1 follows a typical design comprising a current mirror formed by transistors 22, 24 where the transistor 22 is arranged in a diode mode by coupling the gate with the drain. The transistors 22, 24 are in this design P channel metal oxide semiconductor (PMOS) field effect transistors. Furthermore, the reference voltage/current generator 12 comprises a second set of transistors 26, 28 where the transistor 28 is also coupled to the diode mode. The transistors 26, 28 are in this design N channel metal oxide semiconductor (NMOS) field effect transistors. As illustrated in FIG. 1, the gates the transistors 22, 26 are coupled with the gates of the transistors 24, 28, respectively, and the drains of the transistors 22, 24 are coupled with the drains of the transistors 26, 28, respectively. Accordingly, the transistors 22 to 28 enclose a self-biasing reference current loop. With respect to the output of the reference voltage and reference current, further transistors 44, 46 may be provided, driven by the bias voltage Vbias in the current mirror. The transistor 46 may be dimensioned to operate as the current source to provide the reference current Iref, and the reference voltage Vref may be taken over an impedance 42 coupled to a drain of another current source transistor 44.

As illustrated in FIG. 1, the start-up circuit comprises the impedance circuit 36 coupled to the current mirror of the reference voltage/current generator 12 during the start-up. The coupling may be realized by a first switch 34, e.g, a transistor switch, configured to couple the impedance circuit to the bias voltage line. The switch 34 may be responsive to the start-up signal KS (kick start) input to the switches. The start-up signal may be responsive to a power-up signal PU provided by a controller circuit or any other circuit that calls for the activation of the reference voltage/current generator 12. Alternatively, the start-up signal may be provided directly by the controller or said any other circuit. The start-up signal KS may be further responsive to the state of the current mirror circuit. In the embodiment of FIG. 1, an XOR logic gate 35 is provided with inputs coupled to the power-up signal and to the gates of the transistors 26, 28. The start-up circuit may further comprise a second switch 32, e.g. a transistor switch, also controlled by the start-up signal KS and configured to couple the bypass current source to the impedance circuit 36. In FIG. 1, the bypass current source is represented by the transistor 30 (also PMOS transistor as the transistor 22) that may be configured as a current source. The first switch 34 and the second switch 32 may thus couple parallel current paths of the start-up circuit: the current path to start-up the current mirror and the bypass current path from the current source 30. The first switch 34 and the second switch 32 may be configured to close (and open) concurrently in response to the start-up signal.

Let us next describe the operation of the start-up circuit 10 when it wakes up the reference voltage/current generator 12. When the power-up signal I’ll goes HIGH, while the gate voltage of the transistors 26, 28 are also HIGH, the output of the XOR gate 35 goes high and enables the start-up circuit. Accordingly, the start-up signal KS closes the switches 32, 34, and the switch 34 couples the impedance 36 to the bias voltage line of the current mirror 22, 24, thus forcing Vbias to a LOW state that charges the gates of the transistors 22, 24 and opens a current flow in the in the loop formed by the transistors 22 to 28. Some of the current flows to the ground via the impedance 36. The impedance circuit 36 may comprises a resistor, a diode in a pass mode, a combination of both, or another impedance circuit. Impedance of the impedance circuit 36 may be low enough to virtually ground the gates of the transistors 22, 24 in the start-up phase.

Because the transistor 22 is in the diode mode and its source-drain impedance is thus low, the start-up period causes the bias voltage Vbias to drop towards the ground. Unless limited, the change in the bias voltage may cause the reference voltage Vref may rise over the target reference voltage and even close to the supply voltage VDD, as in the conventional solutions. Now, thanks to the bypass current source 30 driven by the bias voltage Vbias, the rise of the Vbias can be limited. The gate of the transistor 30 may be coupled with the bias voltage Vbias and, thus, the same bias voltage Vbias drives both transistors 22, 30. Accordingly, when the current starts flowing in the current mirror formed by the transistors 22, 24, the bypass current source 30 will also start outputting the bypass current, thus limiting the rise of the bias voltage Vbias. The current in the bypass current path via the switch 32 raises the voltage over the impedance circuit 36, thus limiting the current drawn by the startup-circuit from the reference voltage/current generator 12. When the potential over the impedance circuit 36 is equal to the bias voltage Vbias, the current in the start-up circuit flows only through the bypass current path and the start-up circuit will no longer increase the bias voltage Vbias. At this stage, the reference voltage/current generator 12 has been started up. At this stage, the input of the XOR gate 35 from the reference voltage/current generator 12 may also go to LOW state to set the start-up signal KS to LOW state and shut down the start-up circuit 10, Accordingly, the start-up signal KS may be a short-term pulse that can be generated, for example, by using the power-up signal and the state of the reference voltage/current generator 12 in the above-described manner. Alternatively, an exclusive OR (XOR) logic gate having as inputs the power-up signal PU and its delayed copy may be used, wherein the delay determines the duration of the short-term pulse. The generation of the short-term pulse may be carried out in the start-up circuit (e.g. by the XOR and a delay circuit), or the start-up circuit may receive the short-term pulse generated externally.

In an embodiment, the bypass current source 30 is dimensioned to have greater dimensions than a biasing transistor 22 of the current mirror circuit. The biasing transistor 22 may be the transistor of the current mirror that is in the diode mode. Conventionally, the dimensions of a MOS transistor are defined in terms of a channel width W to channel length L, i.e. the ratio W/L. Accordingly, in this embodiment $$W_{30}/L_{30}>W_{22}/L_{22}$$

It means that the current source 30 has a greater current output capability than the biasing transistor 22, thereby effectively limiting the rise of the bias voltage over the reference voltage level.

In another embodiment, the dimensions of the bypass current source 30 are defined via the following Equation:

$$\frac{W_{30}/L_{30}}{W_{22}/L_{22}} \geq \frac{V_{BIAS}}{Z_{36}}\frac{1}{I_{BIAS}}$$

Accordingly, the dimensions of the transistor 30 with respect to the dimensions of the transistor 22 may be defined via the impedance of the impedance circuit, the bias voltage Vbias and the bias current Ibias in the current mirror. If the dimensions of the current source 30 are not great enough, the start-up circuit may draw more current from the current mirror, thus causing the bias voltage Vbias to rise over the reference voltage. Designing the dimensions of the current source 30, this phenomenon can be prevented or at least reduced with respect to the conventional solutions. Even with smaller dimensions of the bypass current source, the bypass current path will limit the raise of the bias voltage Vbias in the current mirror.

Yet another advantage of the bypass current generator according to the embodiments described above is that it reduces the effect sub-optimal characteristics of the start-up circuit. In the conventional solutions, if there is undesired current leakage in components of the start-up circuit, e.g. in one or more transistors, the leakage can be delivered to the reference voltage/current circuit after the start-up process, thereby causing undesired fluctuation in the reference voltage/current. In the described embodiments, if the switch 34 would cause leakage and, thereby, induce undesired current flow in the current loop of the reference voltage/current generator 12, the bypass current generator would immediately raise the current flow as well, thereby carry out immediate compensation and avoid the increase in the reference voltage/current. The virtue is that the bypass current generator 30 is driven by the bias voltage Vbias.

Figure 2:
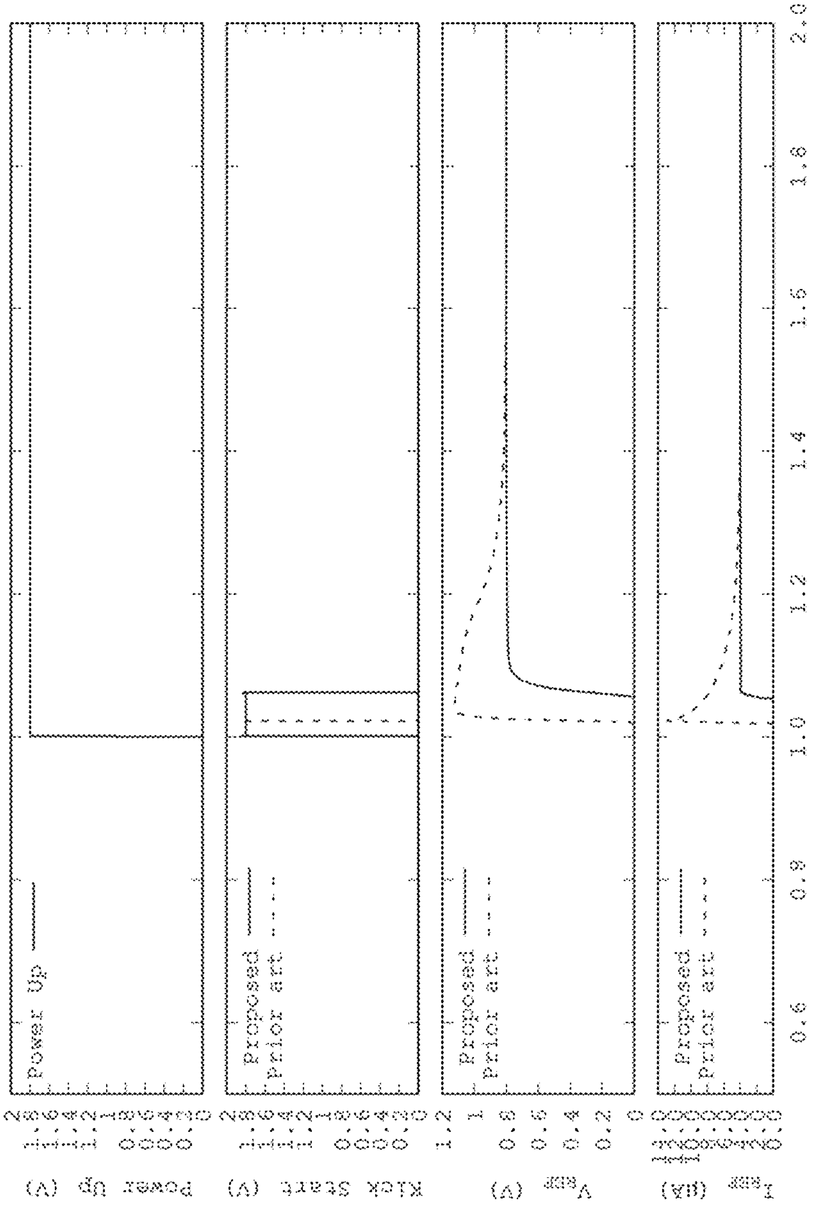
FIG. 2 illustrates an effect of the start-up circuits according to the described embodiments.

FIG. 2 illustrates the effect of the start-up circuitry with the bypass current generator and the bypass current path of the above-described embodiments. On top of FIG. 2, the power-up signal PU (Power Up in FIG. 2) is illustrated. The power-up signal is illustrated as a step function, indicating that when the power-up signal is in the high state, the reference voltage/current generator is switched on. Accordingly, the power-up signal is a static binary signal with a state defining whether the reference voltage/current generator is switched on or off. As described above, the start-up signal KS (Kick Start in FIG. 2) may be a short-term pulse that goes to low state after the state of the reference voltage/current generator 12 has settled. The duration of the start-up signal pulse may be, for example, less than 0.2 microseconds (μs), as illustrated in FIG. 2. The duration may depend on the state and design of the reference voltage-current generator and the start-up circuit. The curve below the start-up signal illustrates the behaviour of the reference voltage Vref in the circuit, of FIG. 1. The dashed curve illustrates the behaviour when using a conventional start-up circuit without the bypass current source and the bypass current path to limit the current induced to the current mirror circuit, by the start-up circuit during the start-up. As can be seen, the conventional solution causes a peak over the target reference voltage before settling to the target level of the reference voltage. As illustrated by the solid curve, the reference voltage rises up to the target reference voltage level, even without the peak when the reference current generator 30 is dimensioned appropriately. Even with smaller dimensions of the reference current generator, the peak can be reduced with respect to the conventional solution. The same behaviour can be observed in the reference current Iref illustrated in the bottom graph of FIG. 2. A conventional start-up circuit without the bypass current circuit induces a peak above the target reference current level (dashed curve), while the bypass current generator according to the embodiments described above enable reduction or even elimination of the peak (solid curve).

The circuit diagram illustrated in FIG. 1 discloses a reference voltage/current generator based on a current mirror formed by FET transistors. The same start-up circuit described above in connection with the various embodiments applies to other types of reference voltage/current generators. For example, a bandgap circuit is conventionally used as a reference voltage/current generator, and the bandgap circuit is conventionally based on a current mirror formed by bipolar junction transistors. In such a case, the current mirror formed by the transistors 22, 24 would only be replaced by the bipolar junction transistors. Similarly, the other transistors 26 to 32 of the reference voltage/current generator may be replace by corresponding bipolar junction transistors.

Depending on the design, the reference voltage/current generator circuit coupled to the start-up circuit according to the above embodiments may have a more complex design with more electronic components. The embodiments described above keep the description of the reference voltage/current generator 12 in a simplified form for the sake of clearer understanding.

Embodiments described herein are applicable to systems defined above but also to other systems. The protocols used, the specifications of the systems and their elements develop rapidly. Such development may require extra changes to the described embodiments, Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. A start-up circuit for a self-biasing generator providing a reference voltage or a reference current, the start-up circuit comprising:

an impedance circuit;

a coupling circuit configured to couple, in response to a start-up signal input to the start-up circuit, the impedance circuit to a bias voltage line of a current mirror circuit of the self-biasing generator, thereby inducing current to flow in the self-biasing generator and starting the self-biasing generator;

a bypass current source coupled to the current mirror circuit and to the impedance, wherein the bypass current source is configured to be driven by a current in the current mirror circuit and to supply current to the impedance in proportion to the current in the current mirror circuit, thereby limiting the current induced to the self-biasing generator by the start-up circuit, wherein the bypass current source is dimensioned to have greater dimensions than a biasing transistor of the current mirror circuit.

2. The start-up circuit of claim 1, wherein the bypass current source has a greater current output capability than the biasing transistor.

3. The start-up circuit of claim 2, wherein the bypass current source comprises a transistor and the dimensions of the bypass current source are defined by:

$$\frac{W_{30}/L_{30}}{W_{22}/L_{22}} \geq \frac{V_{BIAS}}{Z_{36}}\frac{1}{I_{BIAS}}$$

where $W_{30}$ and $L_{30}$ represent a channel width and a channel length of the transistor comprised in the bypass current source, respectively, $W_{22}$ and $L_{22}$ represent a channel width and a channel length of the transistor of the current mirror circuit, Vbias and Ibias represent a bias voltage and a bias current of the current mirror circuit, respectively, and $Z_{36}$ represents impedance of the impedance circuit.

4. The start-up circuit of claim 1, wherein the coupling circuit comprises a first switch configured to couple the impedance circuit to the bias voltage line and a second switch configured to couple the bypass current source to the impedance circuit.

5. The start-up circuit of claim 4, wherein the first switch and the second switch couple parallel current paths of the start-up circuit.

6. The start-up circuit of claim 4, wherein the first switch and the second switch are configured to close concurrently in response to the start-up signal.

7. The start-up circuit of claim 1, wherein the bypass current source comprises a transistor having a gate coupled to the current mirror circuit.

8. The start-up circuit of claim 1, wherein the impedance circuit is configured to, when coupled to the current mirror circuit, to draw current from the current mirror circuit, thereby starting the self-biasing generator.

9. The start-up circuit of claim 8, wherein the impedance circuit is configured to effectively ground the current mirror circuit, when coupled to the current mirror circuit.

10. The start-up circuit of claim 1, wherein the start-up signal is configured to be responsive to a power-up signal enabling the start-up circuit and the self-biasing generator and to a state of the self-biasing generator.

11. The start-up circuit of claim 10, wherein the start-up signal is configured to disable the start-up circuit when the self-biasing generator has reached its operational state and is outputting at least one of a reference voltage and a reference current at a target level.

12. A self-biasing generator for providing a reference voltage or a reference current, comprising:

a current mirror circuit;

an output signal line coupled to the current mirror circuit and configured to output the reference voltage or the reference current; and a start-up circuit comprising an impedance circuit, and a coupling circuit configured to couple, in response to a start-up signal input to the start-up circuit, the impedance circuit to a bias voltage line of a current mirror circuit of the self-biasing generator, thereby inducing current to flow in the self-biasing generator and starting the self-biasing generator, the start-up circuit further comprising a bypass current source coupled to the current mirror circuit and to the impedance, wherein the bypass current source is configured to be driven by a current in the current mirror circuit and to supply current to the impedance in proportion to the current in the current mirror circuit, thereby limiting the current induced to the self-biasing generator by the start-up circuit, wherein the bypass current source is dimensioned to have greater dimensions than a biasing transistor of the current mirror circuit.

* * * * *